April 16, 1940.   L. J. KOCI   2,197,221
TOASTER AND THE LIKE
Filed Sept. 10, 1935   7 Sheets-Sheet 1
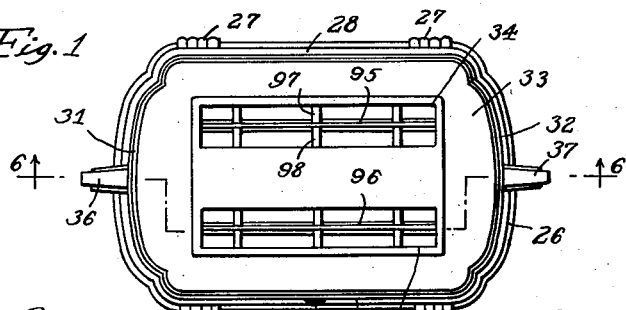
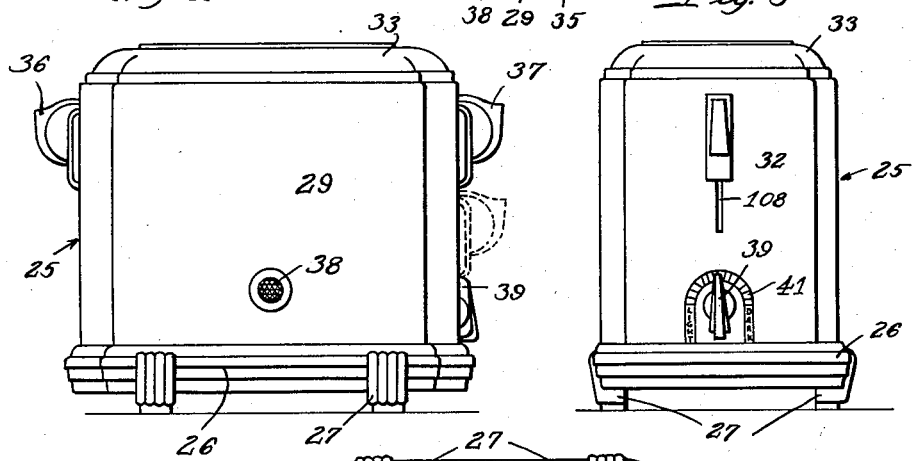
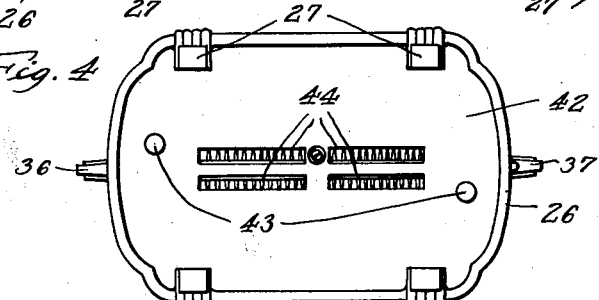
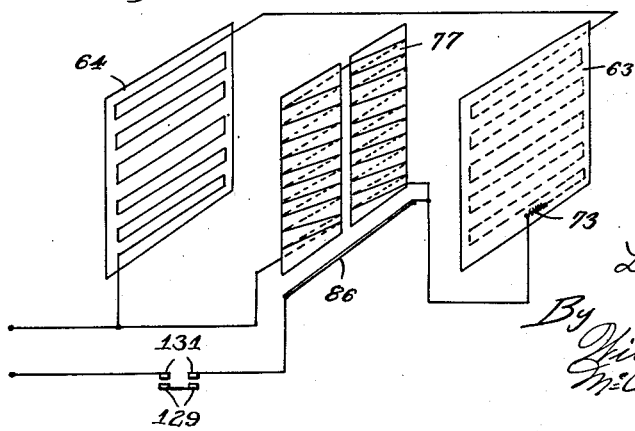
Inventor:
Ludvik J. Koci
By Wilson, Dawell
McCanna & Wintercorn
Attys.

April 16, 1940.    L. J. KOCI    2,197,221
TOASTER AND THE LIKE
Filed Sept. 10, 1935    7 Sheets-Sheet 2
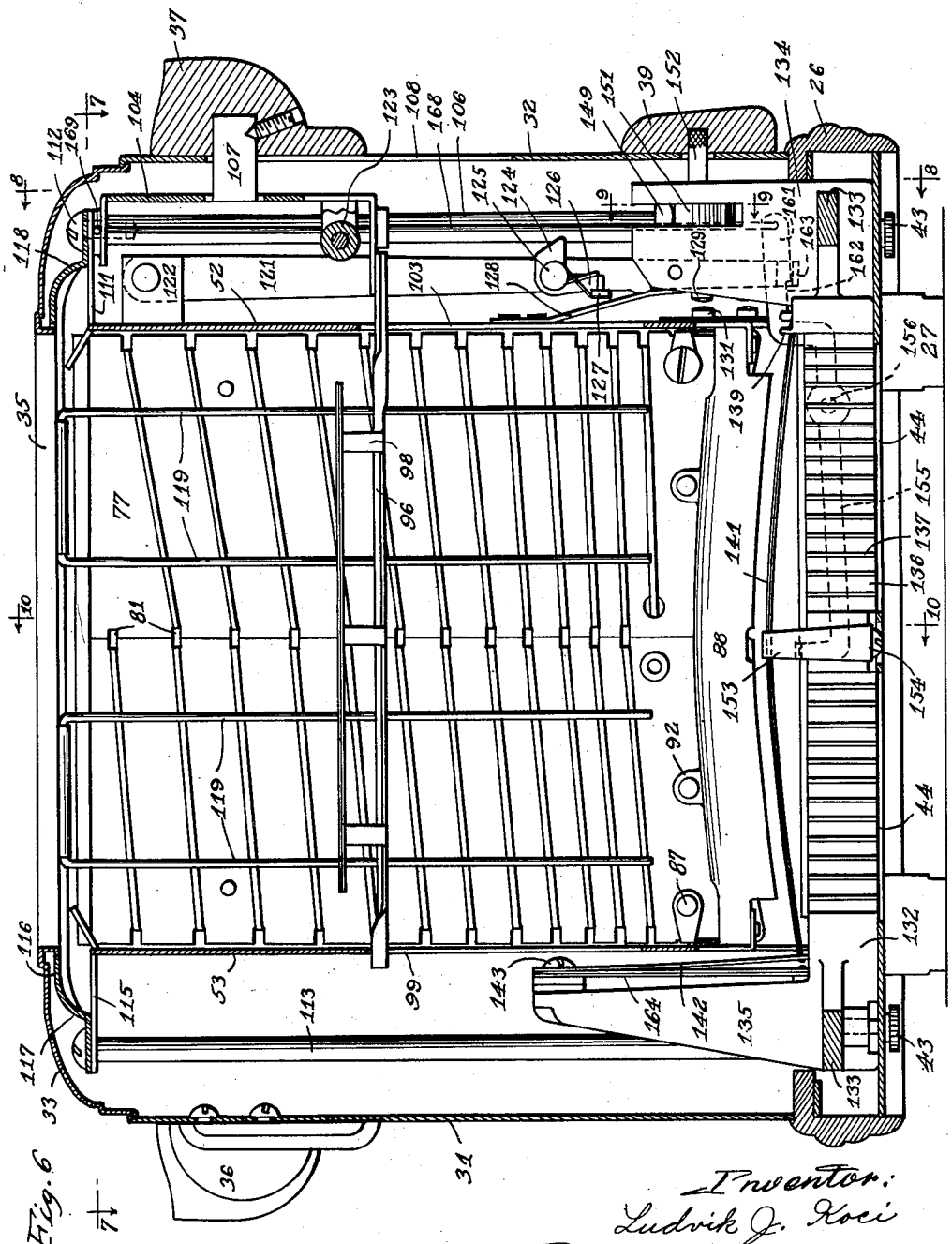

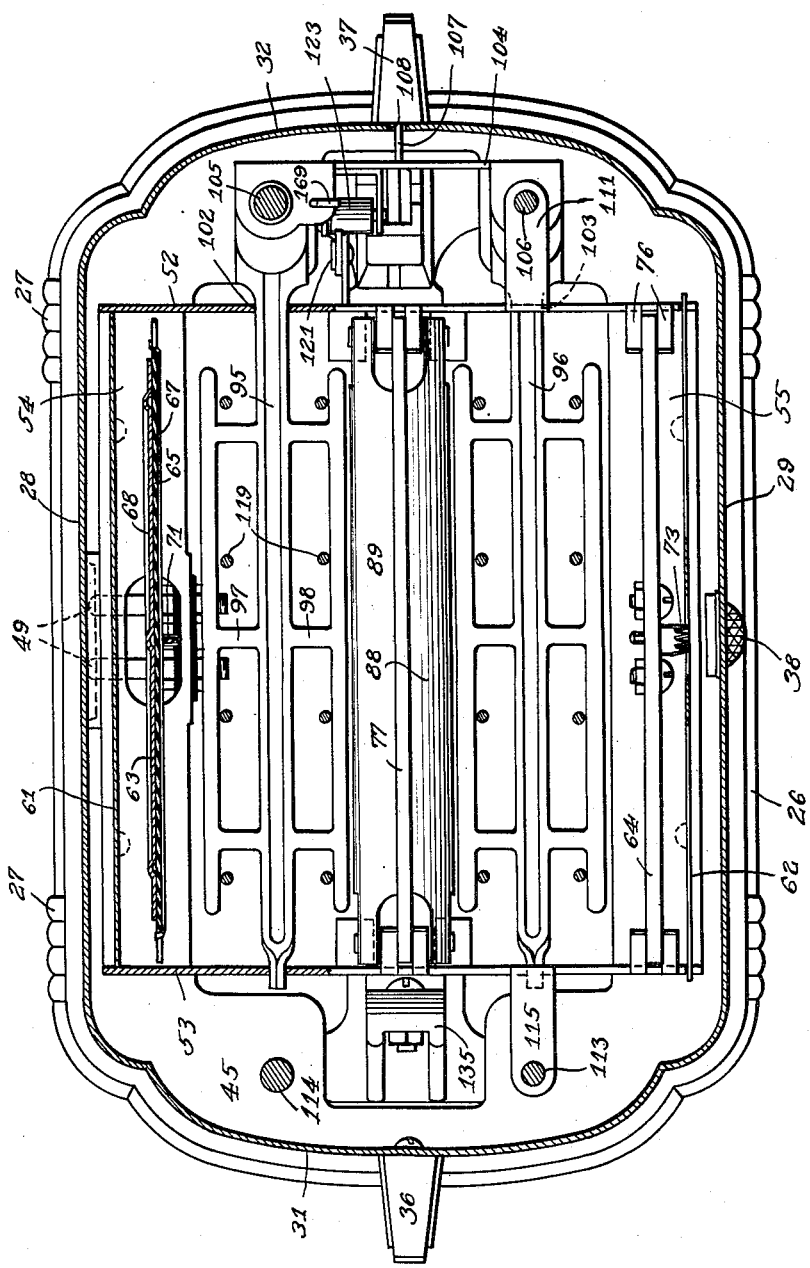

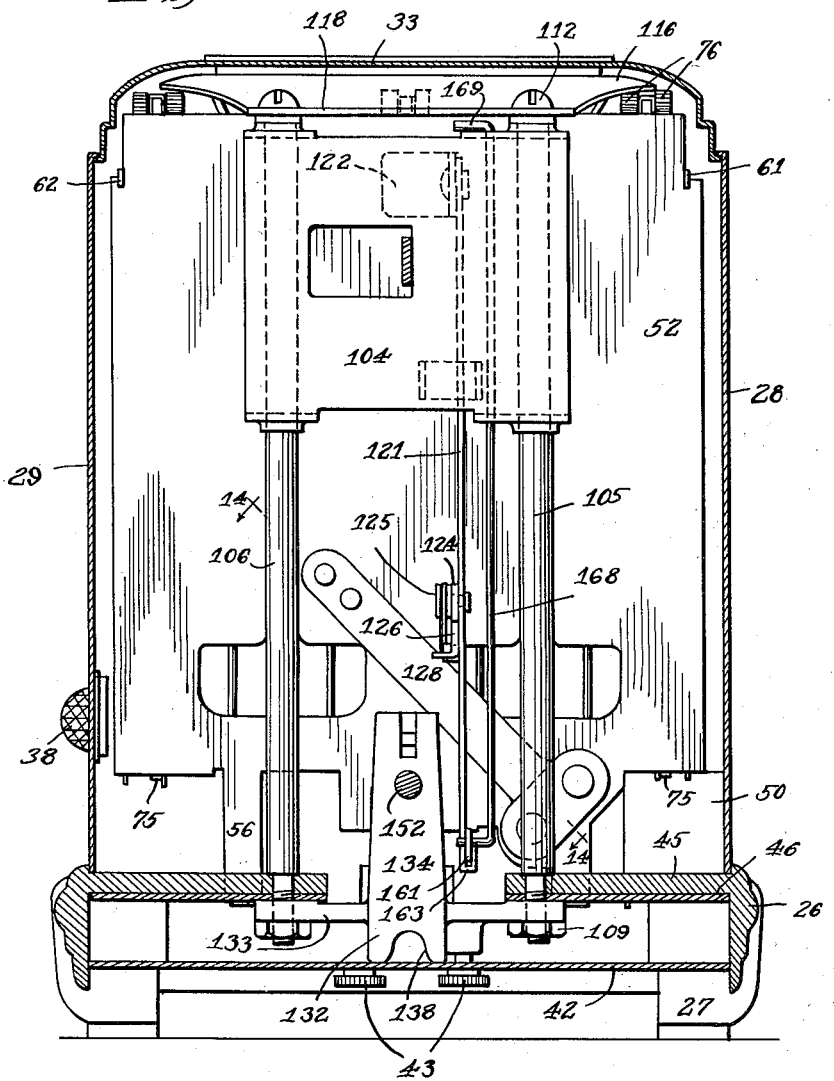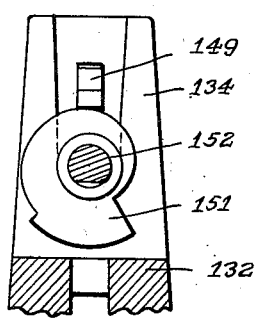

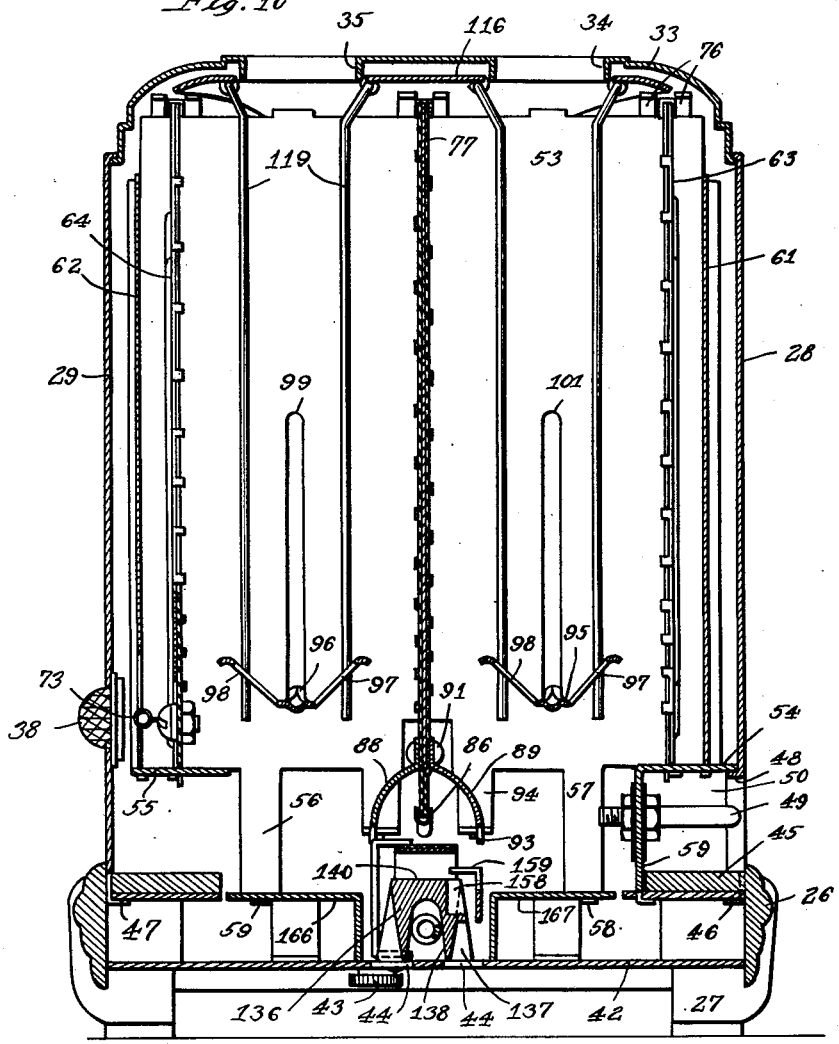

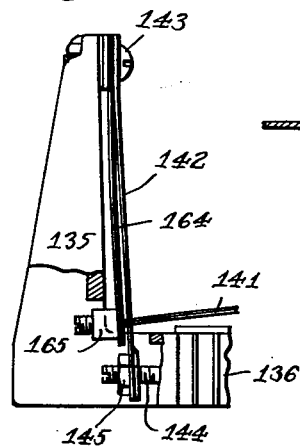
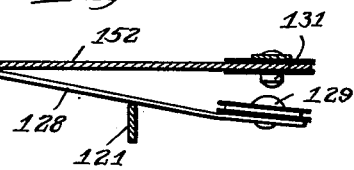
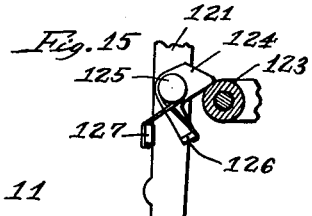
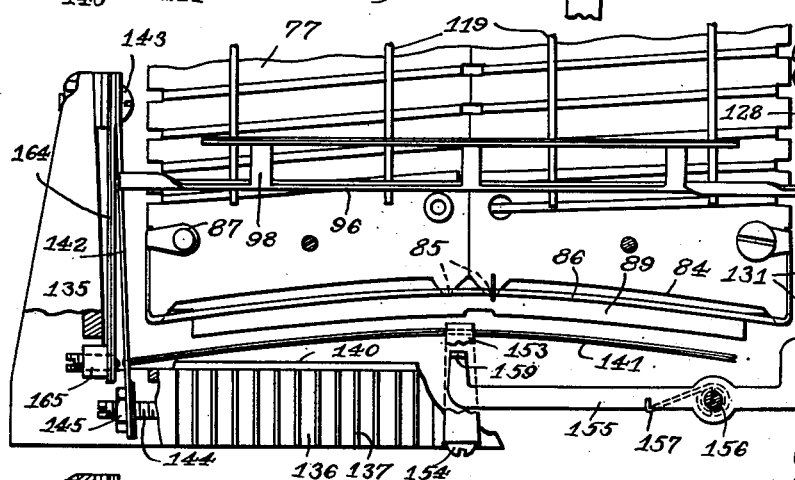
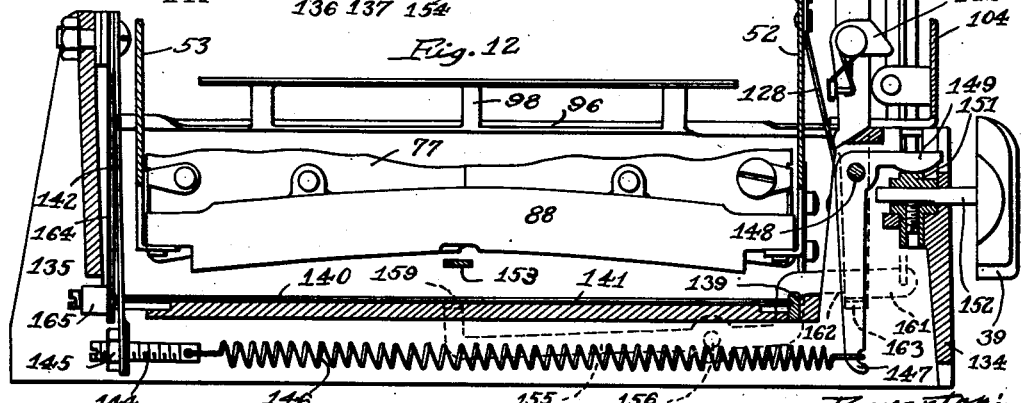

April 16, 1940. L. J. KOCI 2,197,221
TOASTER AND THE LIKE
Filed Sept. 10, 1935 7 Sheets-Sheet 7
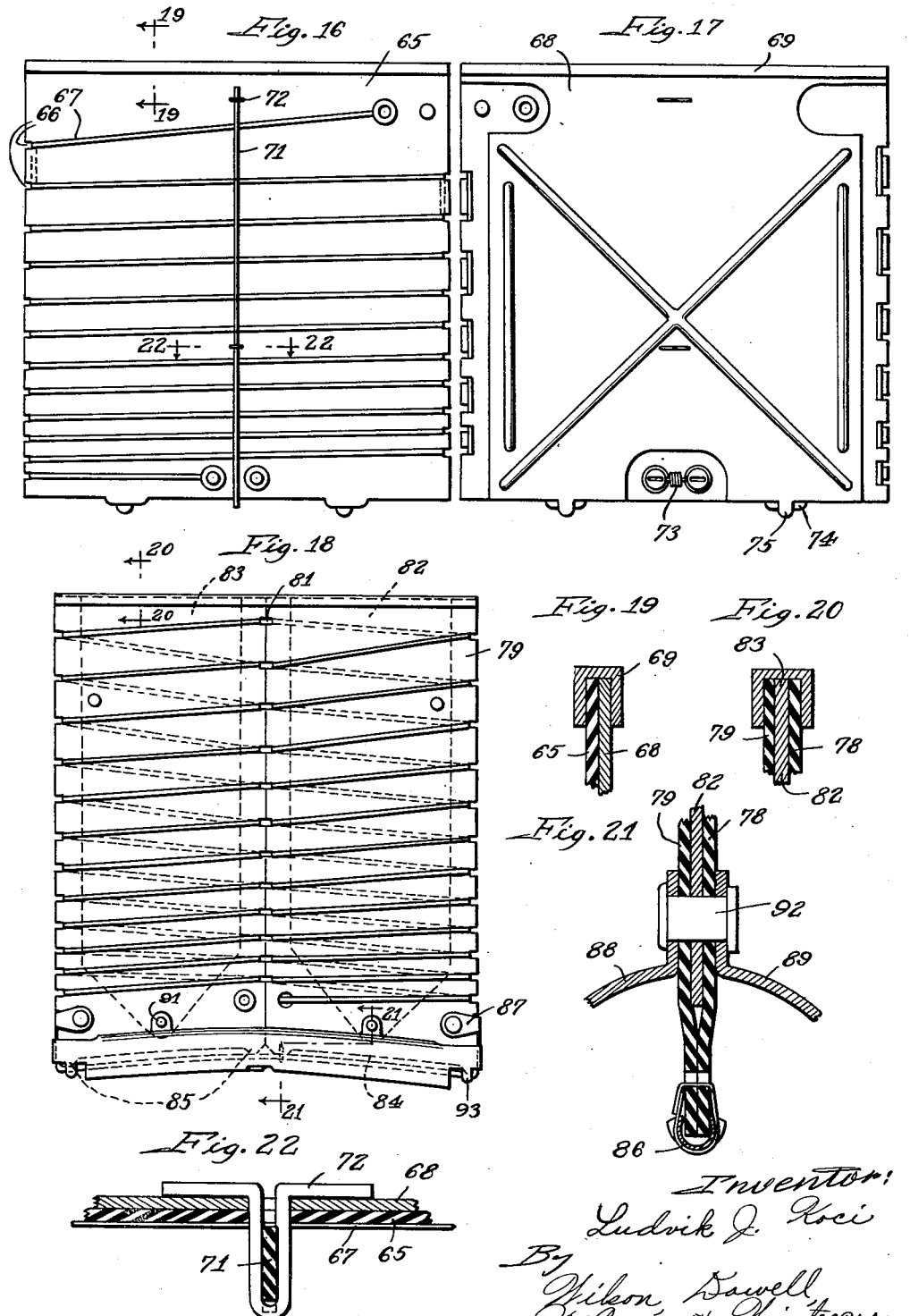

Patented Apr. 16, 1940

2,197,221

UNITED STATES PATENT OFFICE 2,197,221

TOASTER AND THE LIKE

Ludvik J. Koci, Chicago, Ill., assignor to Chicago Flexible Shaft Company, Chicago, Ill., a corporation of Illinois Application September 10, 1935, Serial No. 39,957

34 Claims. (Cl. 219—19)

This invention relates to cooking devices of the type wherein the cooking operation is automatically controlled to produce uniform results, and has special reference to a bread toaster, though many of the features are not limited to such use.

A primary object of the invention is the provision of a cooking device having improved means for controlling the cooking operation which shall be automatic in operation and produce a uniform cooking effect upon the article throughout a succession of cooking operations.

Another object is the provision of an automatic cooking device wherein the control mechanism is substantially silent in operation, is self-compensating for certain variations in cooking conditions, and is of simple constructon such that it may be manufactured at a substantially lesser cost than control mechanisms previously used in the art.

I have also aimed to provide a toaster having improved structure characteristics effective to facilitate the manufacture and assembly of the structure and to produce a rigid and sturdy device.

A still further object of the invention is the provision of heating elements of improved construction.

Other objects and advantages will be apparent from the following discussion and the accompanying drawings, in which—

Figure 1 is a top view of a toaster embodying my invention;

Fig. 2 is a side view thereof;

Fig. 3 is an end view thereof;

Fig. 4 is a bottom view;

Fig. 5 is a wiring diagram of the toaster shown in the figures;

Fig. 6 is a section on the line 6—6 of Figure 1;

Fig. 7 is a section substantially on the line 7—7 of Fig. 6;

Fig. 8 is a section on the line 8—8 of Fig. 6;

Fig. 9 is a section on the line 9—9 of Fig. 6;

Fig. 10 is a section on the line 10—10 of Fig. 6;

Figs. 11 and 12 are fragmentary sections somewhat similar to Fig. 6 with certain of the parts broken away;

Fig. 13 is a view of one end of the thermostat and its support;

Fig. 14 is a section on the line 14—14 of Fig. 8;

Fig. 15 is a fragmentary view of the switch cam and operating mechanism;

Fig. 16 is a face view of one of the side heating elements;

Fig. 17 is a view of the back of the heating element;

Fig. 18 is a side view of the central heating element;

Fig. 19 is a section on the line 19—19 of Fig. 16;

Fig. 20 is a section on the line 20—20 of Fig. 18;

Fig. 21 is a section on the line 21—21 of Fig. 18; and

Fig. 22 is a section on the line 22—22 of Fig. 16.

I have shown the invention by way of illustration as embodied in a bread toaster, but it will be apparent that many of the features thereof are generally applicable to cooking devices. In Figs. 1 to 4, inclusive, general exterior views of the toaster show a casing designated generally by the numeral 25 affixed to a base member 26 advantageously of synthetic resin, such as "Bakelite" or similar insulation material. The base member 26 in this instance comprises a ring-like configuration of general rectangular shape as best shown in Fig. 4, having feet as indicated at 27 for supporting the toaster on a table or the like. The casing 25 is of general rectangular cross-section having side walls 28 and 29 and end walls 31 and 32. A top 33 covers the top and is provided with slots 34 and 35 through which the slices of bread are inserted. Handles 36 and 37 are positioned on the end walls 31 and 32, the handle 36 being stationary and the handle 37 being movable between the full and dotted line positions shown in Fig. 2 for the purpose of inserting and removing the bread, as will presently more fully appear. A lens 38 or similar device is inserted in the side of the casing and serves to indicate the operative condition of the toasting mechanism in a manner presently to be described. A knob 39 on the end 32 of the casing cooperates with the dial 41, the knob being rotatable for the purpose of adjusting the degree of toasting or cooking. The lower side of the base member 26 has a plate 42 extending thereacross attached by means of thumb screws 43. The plate also has a plurality of slots 44 for providing ventilation into the casing for a purpose which will presently become apparent.

Referring now to Fig. 10, the base member 26 has an inwardly extending flange 45 around substantially its entire circumference against which a metal plate 46 is positioned, the casing 25 seating against this flange along its bottom edge and having fingers 47 extending through the flange and bent over against the bottom surface of the plate 46 to retain the same in place. The side wall 28 of the casing has an opening 48 within which a pair of terminal posts 49 are secured on a plate 51 inwardly spaced from the wall 28 so that the terminal posts rest completely within the recess thus formed. The plate 51 has end pieces 50 bent over to contact the side wall. Electrical energy is supplied to the toaster through these terminal posts in the usual manner. A supporting frame having end plates 52 and 53 and bottom strips 54 and 55 connecting the end plates is supported on the plate 46 by legs 56 and 57 which pass through slots in the plate 46 and are bent over against the lower edge thereof as shown at 58 and 59. The bottom strip 54 forms a top closure for the opening 48 within which the terminal posts are supported, as best shown in Fig. 10. Metal sheets 61 and 62 extend between the plates 52 and 53 adjacent opposite side edges thereof for the purpose of lending rigidity to the frame structure and to prevent the heat from the heating elements being radiated directly against the casing. Spaced inwardly from the sheets 61 and 62 are heating elements 63 and 64 of the type shown in detail in Figs. 16 and 17. Each of these heating elements consists of a sheet of mica or similar insulating material 65 having slots 66 spaced along the side edges thereof through which is passed a resistance element 67 wound thereon by looping the resistance element between adjacent slots in such manner that the resistance wire passes only on one side of the mica sheet. A metal plate 68 preferably of aluminum is positioned against the back of the mica sheet. The plate and the mica sheet are held together by means of a clamping strip 69 best shown in Fig. 19 extending along the upper edge of the heating element. A mica strip 71 is positioned vertically against the face of the mica sheet 65 and rests edgewise thereagainst, as shown in Figs. 16 and 22, the strip being held thereagainst by means of clips 72 which pass around the strip and through the mica sheet and plate as shown in Fig. 22. The purpose of this strip is to hold the various strands of the heating element 67 firmly against the mica sheet and prevent sagging or other movement under temperature changes. The mica sheet 65 carries a loop of resistance wire 73 in a position directly behind the window 38, this loop being connected in the circuit of the heating element so that when the heating element is energized the coil 73 will become luminous and visible through the window 38 to indicate that the heating elements are energized. The lower edge of the mica strip carries a depending finger 74 and the lower edge of the metal plate 68 carries a similar finger 75 of greater length which pass through openings in the bottom strips 54 and 55 to secure the heating elements therein, the fingers of the plate being bent over to clamp the heating element to the strips. The upper ends of the heating elements 63 and 64 are held in position by fingers 76 on the upper edges of the end plates 52 and 53 (Fig. 10).

A central heating element 77, shown in detail in Fig. 18, is positioned in the center of the casing. This heating element consists of a pair of mica sheets 78 and 79 having openings 81 spaced along the vertical center line thereof through which the resistance wire is wound in the manner shown in the figure. Metal plates 82 and 83 are interposed between the two mica sheets for the purpose of stiffening the structure and to serve a function which will presently appear. The lower edges of the mica strips are arcuately shaped as shown at 84 and have a plurality of projections 85 to which a secondary heating element 86 is attached, this heating element consisting of a strip of resistance metal extending along the lower edge of the mica strips and fastened thereto as shown at 87. Arcuate baffle strips 88 and 89 extend along the lower edge of the mica and are fastened thereto as shown at 91 by means of rivets 92 or otherwise, the lower edges of these baffle strips extending downward and enclose the secondary heating element 86 as best shown in Fig. 10. The lower end of the heating element is attached to the end plates 52 and 53 by means of lugs 93 which pass through downwardly extending fingers 94 on the end plates, as best shown in Fig. 10.

Toast carriers 95 and 96 each having angularly disposed side members 97 and 98 are disposed in the spaces between the heating elements for vertical movement in slots 99 and 101 in the end plate 53 and in slots 102 and 103 in the end plate 52. The ends of the carriers passing through the slots 102 and 103 are integral with the sliding member 104 which is positioned for vertical movement on rods 105 and 106. The member 104 has a bracket 107 extending through the end of the casing and carrying the handle 37, the casing being slotted as shown at 108 for vertical movement of the handle and toast carriers.

The rods 105 and 106 are positioned on the flange 45 and extend therethrough and through the plate 46 being attached thereto by means of nuts 109 (Fig. 8). The upper end of the plate 52 is attached to the upper ends of these rods by means of fingers 111 and screws 112 in the ends of the rods. A pair of rods 113 and 114 are similarly positioned in the other end of the casing and serve to support the plate 53 by means of fingers 115. A false top 116 is positioned just beneath the top of the casing and is attached to the upper ends of the rods 105, 106, 113 and 114 as shown at 117 and 118. This false top carries a plurality of depending guide wires 119 which pass through the openings in the toast carriers 95 and 96 and serve to guide and position the toast on the toast carriers.

A vertically disposed lever 121 is pivotally carried on the plate 52 by means of a bracket 122 and the slidable member 104 carries a roller 123 engaging the edge of the lever 121 as best shown in Fig. 6. The lever 121 also carries a cam 124 by means of a pivot pin 125, which cam has an arm 126 spring pressed against an abutment 127 on the lever. When the handle 37 is moved downward from the toast inserting and removing position shown in Fig. 6, in which it is held by the roller 123 seating in a notch 120 on the lever 121, to the toasting position shown in Fig. 11, the roller 123 engages the cam urging the lever 121 to the left facing Fig. 6. Thereupon the edge of the lever 121 which bears against a switch lever 128 carried on the plate 52 causes the switch lever to move so that its contacts 129 engage contacts 131 positioned on the plate 52 causing the circuit through the toaster to be closed and the toasting operation to commence.

The toasting interval is controlled by thermostat means located in the lower part of the casing. This includes a frame member designated generally by the numeral 132 extending longitudinally of the casing and attached to the underside of the plate 46 by means of the rods 105, 106, 113 and 114 and the nuts holding these rods in place, as best shown in Fig. 8, the frame member having ears 133 receiving the lower ends of the rods. The frame has upstanding end pieces 134 and 135 at the opposite ends thereof and an intermediate portion 136 having a plurality of vertically disposed ribs 137 on each side thereof, a centrally disposed recess 138 in the lower side (Figs. 6 and 10) and a flat upper surface 140 (Fig. 12). This frame member is preferably formed of aluminum or similar material of high coefficient of heat conductivity. An abutment 139 is positioned adjacent the forward end of the portion 136 which has a groove within which the end of a bimetallic strip 141 seats. The opposite end of the bimetallic strip bears against a strip of spring steel 142 which has suitable grooves for the seating of the end of the strip to prevent displacement thereof. The strip of spring steel 142 is attached to the upper end of the end piece 135 by means of a screw as shown at 143. the strip 142 being spaced from the vertical face of the end piece. The lower end of the strip 142 has a threaded screw 144 passing through the strip and having a nut 145 for adjustment of the position of the screw therein. The screw carries one end of a spring 146, the opposite end of which is attached to a bell crank lever 147 carried in the front end piece 134 on a pivot pin 148. The opposite end 149 of the bell crank lever bears against a cam 151 carried on a pin 152 extending through the front of the casing and carrying the knob 39. Thus, by rotation of the knob 39, the lever 147 is rotated about this pivot point to vary the tension on the spring 146, and in this wise the stress on the thermostat strip 141. This stress causes the thermostatic strip to bow upwardly as shown in Fig. 6. A stop member 153 is attached to the side of the frame as shown at 154 and serves to limit the upward movement of the bimetallic strip. The frame and strip are so positioned in the casing that the strip lies directly beneath the secondary heating element 86, and this heating element is curved so as to substantially conform to the curvature of the bimetallic strip 141 when it occupies the position shown in Fig. 6.

A lever 155 is pivotally carried on the frame member 132 as shown at 156 and has a spring 157 urging the same in a clockwise direction facing the figures. The side of the frame portion 136 has a recess 158 and the end of the lever 155 has an offset portion 159 extending beneath the bimetallic strip and adapted to be forced down into the recess 158 when the bimetallic strip seats against the top surface of the portion 136 (Fig. 10). The opposite end of the lever 155 extends forwardly along the side of the end piece 134, as shown at 161 and has a notch 162 within which the lower end of the vertical lever 121 is adapted to seat. The lower end of the lever 121 is bent backward upon itself as shown at 163 so as to receive the end 161 of the lever 155.

In the operation of the device, when the handle 37 is moved downward, the roller 123 engages the cam 124 forcing the lever 121 in a clockwise direction. Thereupon the switch lever 128 is moved to the closed position and the lower end of the lever 121 is moved over beneath the notch 162 of the lever 155. The lever 155 being spring pressed rotates in a counterclockwise direction so that the lower end of the lever 121 is received in the notch 162. When the roller 123 moves beyond the cam 124, the lever 121 is prevented from rotating in a counterclockwise direction by the lever 155, and the contacts 129 and 131 are therefore held in the closed position. The toasting operation then begins. During the toasting operation the secondary heating element 86 is energized, as will be apparent from Fig. 5, which brings about heating of the bimetallic strip 141. When this strip is heated to a predetermined temperature as determined by the stress or force applied thereon, it snaps down against the upper surface of the portion 136, thereby depressing the end 159 of the lever 155 raising the end 161 and releasing the lever 121 together with the switch lever 128, cutting off the supply of current to the heating elements and terminating the cooking operation. The cooking effect produced on the toast is varied by rotation of the knob 39 which causes change in the stress applied to the bimetallic strip 141 as heretofore described.

A second bimetallic blade 164 is positioned between the face of the end piece 135 and the steel strip 142 as shown at 143 and carries an adjustable pin 165 at its lower end positioned to bear against the strip 142 near the end of the bimetallic strip 141 (see Figs. 11 to 13). This blade is so arranged that upon increasing temperature the lower end thereof warps toward the spring strip 142, and at a predetermined temperature commences to apply additional pressure to the end of the bimetallic strip 141 as shown in Fig. 13. The purpose of this secondary thermostat element is to vary the action of the primary thermostat element 141 in accordance with the dissemination of heat through the toaster. It will be seen that the current will remain on during the interval required to heat the bimetallic strip 141 to a certain definite temperature and that this interval will vary depending upon the initial starting temperature of the thermostatic strip. When the first slices of bread are inserted into the toaster and the toasting operation started, the bimetallic strip will normally be at room temperature. However, if, immediately upon the completion of the first toasting operation a second toasting operation is started, the thermostatic strip 141 will start at a much higher temperature and, consequently, the toasting interval will be shorter than the first toasting interval unless some means are provided for delaying its operation, or, in other words, compensating for this difference in the starting temperature. The secondary bimetallic blade 164 performs this function.

The operation of the toaster is as follows: When the handle 37 of the toaster is in the position shown in Fig. 6, slices of bread are inserted through the openings 34 and 35 at the top of the casing so as to rest upon the toast carriers 95 and 96, the terminal posts 49 being connected to a suitable source of electrical energy. Thereupon the handle 37 is moved downward to the position shown in Figs. 11 and 12. During this movement the wheel 123 engages the cam 124 moving the lever 121 to the position shown in Fig. 11, thereby closing the contact points 129 and 131 energizing the heating elements 63, 64 and 77 starting the toasting operation. Simultaneously with the energization of the above mentioned heating elements, the secondary heating element 86 is energized, which serves to heat the bimetallic strip 141 in proportion to the current flowing through the first mentioned or primary heating elements. However, the metal plates 68, 82 and 83 forming part of the heating elements now act to retard the rate of delivery of heat to the bread since these plates rapidly absorb the heat generated and before the heating elements reach their maximum radiating temperature, it is first necessary for the plates to become heated. These plates are preferably formed of aluminum which has a very high thermal conductivity and specific heat so that they act more or less in the nature of an accumulator to store the heat and give it up gradually and uniformly. Eventually the bimetallic strip 141 will be heated sufficiently to snap down to the position shown in Fig. 12 in surface contact with the top of the frame portion 136. During the latter part of this movement and after the bimetallic strip has acquired considerable kinetic energy it engages the finger 159 on the lever 155 causing this lever to rotate in a counterclockwise direction so as to release the end 163 of the lever 121. The lever 121 is thereupon rotated in a counterclockwise direction by the action of the switch lever or spring 128 and allowing the contact points 129 and 131 to separate, opening the circuit through the toaster. The handle 37 is then manually raised to the position shown in Fig. 6 for the removal of the toast during which movement the cam 124 rotates about the pivot 125 in a counterclockwise direction to permit the passage of the roller 123. When the bimetallic strip 141 snaps down to the position shown in Fig. 12, heat is very rapidly lost to the frame member which, as previously stated, is preferably formed of aluminum so as to have both a high heat capacity and a high specific conductivity so that the bimetallic strip is very rapidly cooled, whereupon it snaps back into the position shown in Fig. 6 preparatory to a succeeding toasting operation. The thermostat frame 132 is positioned in the toaster so that the ribs 137 rest directly over the openings 44 in the bottom plate, and baffles 166 and 167 are positioned on the top of the bottom plate in the manner shown in Fig. 10 so as to confine the upward flow of air through the openings 44. These openings are made relatively small with respect to the openings in the top of the toaster and the upper portion of the toaster is completely enclosed by the casing so as to cause a rapid ingress of air through these bottom openings and past the frame portion 136 and thereby to maintain this portion at a relatively low temperature. As a result of this construction, the bimetallic strip 141 is caused to cool and return to the position shown in Fig. 6 in a very short time. With the construction shown, this time is a matter of two or three seconds. It will be observed that upon the termination of a toasting period the current is merely shut off and the toast remains in the oven where it may be left by the operator until it is desired.

Assuming that the operator desires to toast additional pieces of bread directly after the termination of the first toasting period above described, additional pieces of bread are inserted onto the toast racks and the handle 37 again moved down to its lower position. Again the heating elements come on and the secondary heating element 86 begins to heat the bimetallic strip 141. However, the ambient temperature of the toaster has now been increased above the normal atmospheric temperature due to the previous toasting operation and, consequently, the strip 141 will have a higher initial temperature than in the first toasting operation and would therefore normally snap down when the bread had been toasted to a lesser degree than in the initial toasting period. However, the ambient temperature of the toaster causes the bimetallic blade 164 to warp in a direction to apply additional stress on the bimetallic strip 141 so as to compensate for this change in the initial temperature of the toaster and cause the current to remain on a longer period of time proportional to the ambient temperature of the toaster, as a result of which the second toasting operation will produce toast of the same degree of brownness as the first toasting operation. Throughout successive toasting operations the bimetallic blade 164 functions to increase or decrease the stress on the bimetallic strip 141 depending upon the ambient temperature of the toaster so as to cause successive pieces of bread to be toasted to the same color, the precise position of the blade 164 depending to a large extent upon the interval between the different toasting periods and the extent to which the toaster is allowed to cool between the periods.

The device is so arranged that it may be operated manually if desired. To this purpose a wire 168 is attached to the end 161 of the lever 155 and extends upward through the sliding member 104, as shown in Fig. 8, the upper end being bent at right angles as shown at 169 so that when the sliding member 104 is brought to its uppermost position, the wire is raised, releasing the lever 121 and opening the circuit through the heating elements. It will likewise be observed that the toast racks may be moved to an elevated position during the toasting operation without in any way disturbing the switch or the operation of the thermostat control, since the wire 168 is not actuated until the toast racks reach their uppermost position and therefore the toast may be viewed by merely raising the handle 37 partway upward.

The degree of toasting or the brownness of the toast is regulated by rotation of the knob 39 so as to vary the tension on the spring 146 and consequently the tension on the bimetallic strip 141. It will be noted that because of the stop 153, this variation in the tension of the spring does not affect the position of the rear end of the bimetallic strip 141 nor the influence thereon of the bimetallic blade 164.

Attention is directed to the baffles 88 and 89 and the baffles 166 and 167. The first pair of baffles serve to prevent direct radiation of heat from the primary heating elements to the bimetallic strip 141 and thereby render the reaction of this strip largely responsive to the secondary heating element 86. A further purpose of these baffles is to prevent bread crumbs from falling onto the bimetallic strip and onto the top of the frame portion 136. The baffles 166 and 167 act to confine the flow of air into the bottom of the toaster and to cause this incoming cold air to pass in large part directly over the surface of the frame portion 136 including the ribs 137, and rapidly cool this element. However, the baffles 166 and 167 serve an additional function. The toaster is designed for the simultaneous toasting of two slices of bread, but it will be understood that frequently the operator will desire to toast only a single slice of bread which would ordinarily require a somewhat lesser toasting interval than the two slices in order to toast both the two slices and the single slice to the same degree. The baffles 166 and 167 serve to reduce the toasting interval when a single slice of bread is toasted. In this case either side of the toaster may be used, and radiant heat from the empty side of the toaster will be reflected from the bottom baffle plates against the bimetallic strip 141 and against the bottom of the baffle plates 88 and 89 down onto the bimetallic blade thereby shortening the toasting interval to such an extent that the single slice is toasted to the same degree as two slices would have been in the same operation.

Attention is also directed particularly to the following features: A single thermostat element functions to determine each of successive toasting intervals, its action being modified by a secondary thermostat element to compensate for differences in initial temperature of the toaster. The thermostat element remains at a fixed distance from the heating element until the instant at which the toasting operation is terminated, whereupon the thermostat moves with a snap action, encountering substantially no resistance until it has acquired enough force due to position and motion to operate the release mechanism. The thermostat element is artificially cooled at the termination of each toasting period, in this instance by contact with a relatively cool metal surface, and the time required for this cooling operation is such that it may be included if desired in the toasting interval by positioning the switch mechanism so as to be actuated by the thermostat element upon return from its cool position instead of on its approach to its cooling position as herein disclosed. The metal surface used to cool the thermostat element is in turn positively cooled by a forced circulation of cool air produced by the operation of the toaster. Cooling of the thermostat element proceeds to a definite temperature (in this instance about 200° F.) at which point the thermostat element snaps back to its original position, whereby should a waiting period of several minutes take place before the next toasting period, the thermostat element will cool still further, loosing heat to the surrounding air and parts, in such manner that the next toasting interval will be properly increased to compensate for the drop in toaster temperature during the waiting period. A secondary thermostat element is employed which acts on the primary thermostat element and, in effect, raises the temperature to which the primary thermostat element must be heated as the ambient temperature of the bottom of the toaster increases. The construction of the control mechanism is simple, the parts are sturdy and capable of long continued use without danger of disarrangement or failure, the device operates substantially noiselessly, may be made at relatively small cost, and is capable of simple adjustment so as to cause the general factory run of toasters to substantially duplicate each other in operation.

I claim:

1. The combination in an electrical cooking device of means for applying heat to articles to be cooked in succession, a thermostat element movable in a cycle at each cooking interval for opening the circuit to said heating means upon the application of a predetermined amount of heat to each of said articles to terminate the cooking intervals, and means for rapidly cooling said thermostat element at the close of each cooking interval to return said element to the initial point of the cycle to render the thermostat element operable to control cooking intervals in rapid succession.

2. The combination in an electrical cooking device of means for applying heat to articles to be cooked in succession, thermostat means for opening the circuit to said heating means upon the generation of a predetermined amount of heat thereby to terminate the cooking intervals, and a relatively cool contact member located for contact with said thermostat means for cooling the same at the close of each cooking interval to render the thermostat means operable in rapid succession.

3. The combination in an electrical cooking device of means for applying heat to articles to be cooked in succession, thermostat means for opening the circuit to said heating means upon the generation of a predetermined amount of heat thereby to terminate the cooking intervals, and a relatively cool contact surface having high thermal conductivity located for contact with said thermostat means at the close of each cooking interval to rapidly cool the same to a predetermined temperature and render the thermostat means operable in rapid succession.

4. The combination in an electrical cooking device of means for applying heat to articles to be cooked in succession, thermostat means for opening the circuit to said heating means upon the application of a predetermined amount of heat to each of said articles to terminate the cooking intervals, a relatively cool contact surface having high thermal conductivity located for contact with said thermostat means at the close of each cooking interval to rapidly cool the same and render the thermostat means operable in rapid succession, and means for cooling the contact surface during the operation of the cooking device.

5. The combination in an electrical cooking device of means for applying heat to articles to be cooled in succession, thermostat means for opening the circuit to said heating means upon the application of a predetermined amount of heat to each of said articles to terminate the cooking intervals, an aluminum contact member located for surface contact with said thermostat means for rapidly cooling the same at the close of each cooking interval to prepare the same for the succeeding cooking interval, and means for directing a draft of air against the contact member to cool the same.

6. The combination in an electrical cooking device of means for applying heat to articles to be cooked in succession, a thermostat element arranged to be heated proportional to said articles and adapted to move with a snap action between a heating position and a cooling position, means to rapidly cool the element in said cooling position and cause the same to return to the heating position, and means actuated by movement of said element to terminate the cooking interval for each article.

7. The combination in an electrical cooking device of means for applying heat successively to articles to be cooked to a predetermined degree, a bimetallic strip arranged to be heated proportional to said articles and stressed to move with a snap action between a heating position and a cooling position, means for rapidly conducting a portion of the heat away from said element in said cooling position and effectuate its return to the heating position, and means actuated by movement of said element to terminate the cooking interval.

8. The combination in an electrical cooking device of heating means for cooking articles in succession to a predetermined degree, a thermostat element adapted to move with a snap action between a heating position and a cooling position, secondary heating means for heating the thermostat element in proportion to the heat supplied by said heating means, means actuated by movement of said element to terminate the cooking interval, and means to rapidly cool said element in the cooling position thereof and effectuate its prompt return to the heating position.

9. The combination in an electrical cooking device of heating means for cooking articles in succession to a predetermined degree, a bimetallic element adapted to move with a snap action between a heating and a cooling position, spring means for applying a compressive force to said element to distort the same to the heating position, a secondary heating means for heating said element in proportion to the heat supplied by the first mentioned heating means to effectuate movement of said element to the cooling position, means actuated by movement of said element to terminate the cooking interval, and means in surface contact with said element in the cooling position thereof to rapidly cool the same and return it to the heating position.

10. The combination in an electrical cooking device of heating means for cooking articles in succession to a predetermined degree, a bimetallic element adapted to move with a snap action between a heating and a cooling position, spring means for applying a compressive force to said element to distort the same to the heating position, a secondary heating means for heating said element in proportion to the heat supplied by the first mentioned heating means to effectuate movement of said element to the cooling position, means in surface contact with said element in the cooling position thereof to rapidly cool the same and return it to the heating position, means actuated by movement of said element to terminate the cooking interval, and means for manually varying the tension on said spring means to adjust the degree of cooking.

11. The combination in an electrical cooking device of means for applying heat to articles to be cooked in succession, thermostat means for opening the circuit to said heating means upon the application of a predetermined amount of heat to each of said articles to terminate the cooking intervals, means for rapidly cooling said thermostat means at the close of each cooking interval to effect the use of the thermostat means in rapid succession, and thermostat means for automatically modifying the action of said first mentioned thermostat means in response to differences in the ambient temperature of the device during successive cooking intervals.

12. The combination in an electrical cooking device of means for applying heat successively to articles to be cooked to a predetermined degree, a bimetallic strip arranged to be heated proportional to said articles compressed to move with a snap action between a heating position and a cooling position, means for rapidly conducting a portion of the heat away from said element in said cooling position to effectuate its prompt return to the heating position, means actuated by movement of said element to terminate the cooking interval, and means to vary the compression on the bimetallic strip in response to differences in the ambient temperature of the device during successive cooking intervals to produce uniform cooking effects through successive cooking intervals.

13. The combination in an electrical cooking device of means for applying heat successively to articles to be cooked to a predetermined degree, a bimetallic strip arranged to be heated proportional to said articles and stressed to move with a snap action between a heating position and a cooling position, means for rapidly conducting a portion of the heat away from said element in said cooling position to effectuate its return to the heating position, means actuated by movement of said element to terminate the cooking interval, a secondary thermostat element responsive to the ambient temperature of the device acting on the first mentioned thermostat to vary the stress thereon with varying ambient temperature to produce uniform cooking effects through successive cooking intervals.

14. The combination in an electrical cooking device of heating means for cooking articles in succession to a predetermined degree, a bimetallic element adapted to move with a snap action between a heating and a cooling position, spring means for applying a compressive force to said element to distort the same to the heating position, a secondary heating means for heating said element in proportion to the heat supplied by the first mentioned heating means to effectuate movement of said element to the cooling position, means in surface contact with said element in the cooling position thereof to rapidly cool the same to return it to the heating position, means actuated by movement of said element to terminate the cooking interval, means for manually varying the tension on said spring means to adjust the degree of cooking, and means to vary the compressive force on the bimetallic strip in response to differences in the ambient temperature of the device to produce uniform cooking effects through successive cooking intervals.

15. The combination in an electrical cooking device for cooking articles in succession, of means for applying heat thereto, a bimetallic strip for terminating the cooking interval, a thermostat frame having end portions and an intermediate heat absorbing portion provided with a contact surface, means on the end portions for supporting said strip, spring means on the frame for stressing the strip to move with a snap action between a heating position and a cooling position against said contact surface, and means carried on the frame for both manually and in response to a changing condition changing the stress on said strip to regulate the cooking interval.

16. The combination in an electrical cooking device for cooking articles in succession, of means for applying heat thereto, a bimetallic strip for terminating the cooking interval, a thermostat frame having upstanding end portions and an intermediate portion provided with a top contact surface and a bottom channel extending between said end portions, a spring member on one of said end portions for supporting one end of said bimetallic strip, a coiled spring positioned in said channel and attached to said spring means for stressing said bimetallic strip to move with a snap action between a heating position and a cooling position in surface contact with said contact surface, a secondary bimetallic blade carried on said end portion for increasing the stress on said first mentioned bimetallic strip proportional to the ambient temperature of the cooking device, manually operable means on the other of said end portions for varying the tension on said coiled spring to vary the temperature at which the first mentioned bimetallic strip moves from the heating to the cooling position, whereby to regulate the cooking interval, and means attached to the frame operative to terminate the cooking interval upon movement of the first mentioned bimetallic strip.

17. The combination in an electrical toaster of a plurality of heating elements for toasting slices of bread in succession, a metallic cooling member, a stressed bimetallic strip heated in proportion to the heat generated to perform the toasting, stressed to move at a predetermined temperature with a snap action from a heating position to a cooling position in surface contact with said cooling member and at a predetermined lower temperature from said cooling position back to the heating position, switch means for said heating elements actuated by said movement, and a casing having a top opening for the insertion of bread and a bottom ventilation opening, said cooling member being positioned in part across said bottom opening to be cooled by the draft of air therethrough caused by the operation of the heating elements.

18. The combination in an automatic electrical toaster of a thermostat for controlling the toasting interval, a heating element comprising superimposed sheets of electrical insulation material, a winding of resistance wire on the remote faces of the sheets, and a plate of high specific heat interposed between the sheets of insulation for the purpose of absorbing the heat from the resistance wire to increase the uniformity in the toasting effect from the heating element.

19. The combination in an electrical toaster of heating elements for toasting successive slices of bread to a predetermined degree, thermostat means primarily responsive to the heat generated in the toaster for measuring and terminating the toasting interval, means to modify the action of said thermostat means in response to differences in the ambient temperature of the device at the start of successive toasting intervals, and heat storage means associated with the heating elements to retard the delivery of heat to the bread during the toasting of the first slice of bread to produce uniform toast through successive intervals.

20. The combination in a toaster of a toast carrier supported for vertical movement between a bread receiving position and a toasting position, heating elements for toasting both sides of the bread in the toasting position thereof, a switch for controlling the flow of current to the heating elements, means for closing the switch upon movement of the carrier from the receiving position to the toasting position, latch means for retaining said last mentioned means in the closed position of the switch whereby to permit subsequent movement of the carrier from the toasting position through a major portion of the distance to the receiving position without disturbing said switch, and thermostat means for releasing said latch means when the bread is toasted to open the circuit through the toasting elements.

21. The combination in a toaster of a toast carrier supported for vertical movement between a bread receiving position and a toasting position, heating elements for toasting both sides of the bread in the toasting position thereof, a switch for controlling the flow of current to the heating elements, means for closing the switch upon movement of the carrier from the receiving position to the toasting position, latch means for retaining said last mentioned means in the closed position of the switch whereby to permit subsequent movement of the carrier from the toasting position through a major portion of the distance to the receiving position without disturbing said switch, thermostat means for releasing said latch means when the bread is toasted to open the circuit through the toasting elements, and means independent of the thermostat means for releasing the latch means upon final movement of the carrier into the bread receiving position.

22. The combination in a toaster of a toast carrier supported for vertical movement between a bread receiving position and a toasting position, heating elements for toasting both sides of the bread in the toasting position thereof, a switch for controlling the flow of current to the heating elements, means for closing the switch upon movement of the carrier from the receiving position to the toasting position, a latch lever for retaining the last mentioned means in the switch closing position whereby to permit subsequent movement of the carrier from the toasting position through a major portion of the distance to the receiving position without disturbing said switch, and a snap acting thermostat mechanism for measuring the toasting interval positioned to actuate said switch lever to open the switch and terminate the toasting operation.

23. The combination in an electric toaster of spaced heating elements, toasting chambers for the reception of bread slices therebetween for simultaneous toasting, thermostat means for measuring and terminating the toasting interval, baffle means for protecting the thermostat means from direct radiation of heat from said heating elements, and means to reflect heat radiation onto said thermostat means from an empty toasting chamber to compensate for the difference in the toasting interval occasioned by the use of less than all of the toasting chambers.

24. The combination in an electric toaster of a central heating element and laterally spaced parallelly disposed heating elements providing parallel toasting chambers, a bimetallic strip disposed beneath the central heating element, extending longitudinally thereof and adapted to move at a predetermined temperature to terminate the toasting interval, a cooling member disposed beneath said bimetallic strip and positioned to be contacted thereby to cool said strip, a baffle disposed above said strip to protect the same from falling crumbs and from direct radiation from the heating elements, and baffles disposed on opposite sides of said cooling member to direct cooling air against the cooling member and to reflect heat from the toasting chambers against the bimetallic strip when the toaster is operated with either of the toasting chambers vacant.

25. The combination in an electrical cooking device of means for applying heat to articles to be cooked in succession, thermostat means for opening the circuit to said heating means to terminate the cooking intervals, and a relatively cool contact member located for contact with said thermostat means for cooling the same at each cooking interval, said heating means comprising a sheet of electrical insulation, a winding of resistance wire thereon, and a plate of high specific heat for absorbing the heat from the resistance wire to form a heat accumulating body for retarding the action of the heating means during the initial cooking interval.

26. The combination in an electrical toaster of a casing, a plurality of vertically disposed toasting elements extending longitudinally within the casing and a unitary control unit comprising a frame having end portions positioned beyond the ends of the heating elements and an intermediate connecting portion below the heating elements extending longitudinally thereof, a bimetal strip supported at its ends on said end portions, a coil spring on the frame extending longitudinally thereof for stressing said bi-metal strip to move with a snap action between heating and cooling positions, means on the frame adapted to be actuated from outside the casing for manually changing the force of said spring to change the stress on said strip, and thermostat means for changing the stress on said strip in response to changes in the ambient temperature.

27. The combination in an electric toaster of a plurality of heating elements for toasting slices of bread in succession, a stressed bi-metallic strip heated in proportion to the heat generated to perform the toasting stressed to move at a predetermined temperature with a snap action from a heating position to a cooling position and at a predetermined lower temperature from said cooling position back to the heating position, switch means for said heating elements actuated by said movement to terminate the toasting operation, and a casing having a top opening for the insertion of bread and a bottom ventilation opening, said strip being cooled in response to the draft of air through said ventilation opening caused by the operation of the heating elements.

28. The combination in a toaster of a toast carrier supported for movement between a bread receiving position and a toasting position, heating elements for toasting both sides of the bread in the toasting position thereof, a switch for controlling the flow of current to the heating elements, means for closing the switch upon movement of the carrier into the toasting position, latch means for retaining the switch in the closed position to permit subsequent movement of the carrier from the toasting position without disturbing the switch, thermostat means for releasing said latch means when the bread is toasted to open the circuit through the toasting elements, and means independent of the thermostat means for releasing the latch means.

29. The combination in an electrical cooking device of means for applying heat to articles to be cooked in succession, and thermostat means for opening the circuit to said heating means to terminate the cooking intervals, said heating means comprising a sheet of electrical insulation, a winding of resistance wire thereon, and including a plate of high specific heat for absorbing the heat from the resistance wire to form a heat accumulating body for retarding the action of the heating means during the initial cooking interval.

30. The combination in an electrical toaster of means for applying heat to slices of bread to be toasted, means for inserting and removing slices of bread in succession, and thermostat means for timing the successive cooking intervals comprising a single set of operating elements positioned and arranged to pass through an identical cycle of events at each cooking interval including temperature responsive means positioned to be heated in proportion to the bread slices, means for supporting the temperature responsive means for movement in response to temperature increase from an initial position to a secondary position and for return to said initial position upon cooling, means for terminating the toasting operation in response to movement of the temperature responsive means in one direction, and means for cooling said temperature responsive element when it reaches said secondary position at a rate such that prior to the time at which a new slice of bread can be inserted upon the completion of a toasting operation said element is returned to said initial position.

31. The combination in an electrical toaster of means for applying heat to slices of bread to be toasted, means for inserting and removing slices of bread in succession, and thermostat means for timing the successive cooking intervals comprising a single set of operating elements positioned and arranged to pass through an identical cycle of events at each cooking interval including temperature responsive means positioned to be heated in proportion to the bread slices, means for supporting the temperature responsive means for movement in response to temperature increase from an initial position to a secondary position and for return to said initial position upon cooling, means for terminating the toasting operation in response to movement of the temperature responsive means in one direction, thermostat means responsive to the ambient temperature of the toaster for varying the temperature at which movement in said last mentioned direction occurs, and means for cooling said temperature responsive element when it reaches said secondary position at a rate such that prior to the time at which a new slice of bread can be inserted upon the completion of a toasting operation said element is returned to said initial position.

32. The combination in an electrical toaster of means for applying heat to slices of bread to be toasted, means for inserting and removing slices of bread in succession for successive toasting operations, and thermostat means for timing the successive timing intervals comprising a single set of operating elements positioned and arranged to pass through an identical cycle of events at each cooking interval including temperature responsive means, secondary heating means for heating said temperature responsive means in proportion to the bread slices, means for supporting the temperature responsive means for movement in response to temperature increase from an initial position to a secondary position and for return to said initial position upon cooling, means for terminating the operation of said secondary heating means in response to movement of the temperature responsive means to the secondary position, means for terminating the toasting operation in response to movement of the temperature responsive means in one direction, and means for cooling said temperature responsive means when it reaches said secondary position to cause the same to return to said initial position, said cooling means acting at a rate such that said means is cooled and returned to said initial position prior to the time at which the completed toast can be removed from the toaster and a new slice of bread conveniently inserted therein.

33. The combination in an automatic electric toaster of a heating chamber parallelly disposed heating elements at opposed sides thereof, a heating element disposed centrally therein to form adjacent slice receiving and toasting sections, said centrally disposed element comprising spaced sheets of electrical insulation, a winding of resistance wire on said sheets, and a metal piece disposed in the space between the sheets to absorb heat from the resistance wire and retard the action of the heating element.

34. In an electrical toaster, a base portion, a pair of heating elements extending above said base portion to define a toasting chamber, a thermal timing device in said base portion including a bimetal strip stressed to assume either a heating position or a cooling position depending upon its temperature, a coil spring positioned parallel with said strip to stress said strip in longitudinal compression so that under sufficient changes in temperature said strip will move from each said position to the other position with a snap action, an auxiliary heating element adjacent said bimetal strip to cause it to snap from said heating to said cooling position, manual means for adjusting the spring stress on said bimetal strip, compensating means for automatically adjusting the stress on said bimetal strip including a second bimetal element extending above said base and adjacent the toasting chamber, and means for terminating the toasting operation in response to the snap-action movement of the bimetal strip from one position to the other.

LUDVIK J. KOCI.